(12) United States Patent
Sioli

(10) Patent No.: US 8,623,195 B2
(45) Date of Patent: Jan. 7, 2014

(54) HIGH PRESSURE ELECTROLYSER

(75) Inventor: Giancarlo Sioli, Cernobbio (IT)

(73) Assignee: Casale Chemicals SA (CH)

( * ) Notice: Subject to any disclaimer, the term of this patent is extended or adjusted under 35 U.S.C. 154(b) by 84 days.

(21) Appl. No.: 13/125,123

(22) PCT Filed: Sep. 17, 2009

(86) PCT No.: PCT/EP2009/062066
§ 371 (c)(1),
(2), (4) Date: Apr. 20, 2011

(87) PCT Pub. No.: WO2010/049214
PCT Pub. Date: May 6, 2010

(65) Prior Publication Data
US 2011/0210012 A1    Sep. 1, 2011

(30) Foreign Application Priority Data

Oct. 27, 2008  (EP) .................................... 08018734

(51) Int. Cl.
*C25B 1/12* (2006.01)
(52) U.S. Cl.
USPC ............ 205/628; 205/637; 204/254; 204/256
(58) Field of Classification Search
USPC ........................... 205/628–639; 204/253–256
See application file for complete search history.

(56) References Cited

U.S. PATENT DOCUMENTS

| | | | |
|---|---|---|---|
| 4,758,322 A | 7/1988 | Sioli | |
| 5,783,051 A | 7/1998 | Hirai et al. | |
| 6,153,083 A | 11/2000 | Hofmann et al. | |
| 2006/0157354 A1* | 7/2006 | Harada | 205/637 |

FOREIGN PATENT DOCUMENTS

| | | |
|---|---|---|
| DE | 4418999 A1 | 12/1995 |
| DE | 102005011316 A1 | 10/2006 |
| EP | 0212240 A1 | 3/1987 |
| JP | 2006131935 A | 5/2006 |
| JP | 2006307262 A | 11/2006 |

* cited by examiner

*Primary Examiner* — Arun S Phasge
(74) *Attorney, Agent, or Firm* — Akerman LLP

(57) ABSTRACT

An electrolyser (100) comprising an electrolysis cell stack (101) inside a pressure vessel (115), wherein the first terminal end plate (107*a*) of the cell stack is integral with one a closed ends of the pressure vessel, thus forming a stationary head (107) of the cell stack equipped with the fluid and electric connections, and the second terminal end plate (108*a*) of the cell stack is inside the vessel and is free to move in a longitudinal direction in response to thermal expansion or contraction, thus forming a floating head (108) of the stack. The pressure vessel (115) is preferably pressurized using a gaseous product obtained in the process of electrolysis.

15 Claims, 3 Drawing Sheets

HIGH PRESSURE ELECTROLYSER

This application is a national phase of PCT/EP2009/062066, filed Sep. 17, 2009, and claims priority to EP 08018734.7, filed Oct. 27, 2008, the entire contents of both of which are hereby incorporated by reference.

FIELD OF THE INVENTION

The invention relates to the field of electrolysers, especially for the electrolysis of water. More in detail, the invention relates to an electrolyser comprising a cell stack inside a pressure vessel, for operation under high-pressure.

PRIOR ART

Electrolysis is a well-known process for separating chemically bonded elements. The process can be operated under pressure when it is desired to obtain the products of the electrolysis under the same pressure.

One of the most common applications of the electrolysis is the production of hydrogen ($H_2$) via electrolysis of water and, in the rest of this specification, reference will be made to this preferred use of the invention.

Generation of hydrogen by electrolysis of water is well known at pressures up to around 30 bar, to serve chemical processes. In recent years, however, the need of producing hydrogen at much higher pressure has appeared.

Hydrogen is a best candidate for energy storage and transportation, especially for distributed power generation from renewable energy sources and for powering hydrogen-fueled or fuel-cell vehicles. The storage of hydrogen for use as a fuel or energy carrier, however, requires a very high pressure, for example 200 bar or more. Currently, suitable pressures for fuel hydrogen storage are considered 350 bar (5000 psi) or 700 bar (10.000 psi). The compression of hydrogen to these very high pressures requires expensive multi-stage compressors and consumes a lot of energy. Hence, there is a strong need of an electrolysis capable of directly producing the hydrogen at the above pressure.

U.S. Pat. No. 4,758,322 discloses a well-known structure of an electrolyser, the so-called filter-press configuration. A number of bipolar cells are stacked in series, and set together between two end plates, interconnected by tie rods. Each one of the bipolar cells comprises an anodic compartment, and a cathode compartment, separated by a diaphragm or a membrane. In turn, each cell is separated from the next one by a conductive wall, the so-called bipolar plate, having opposite polarity on the two faces. The stack of cells is set together by the end plates forming the anode (+) and the cathode (−) terminal connections of the stack. The end plates are forced each other by the tie rods which are electrically insulated to avoid a short circuiting of the cells. A liquid electrolyte is introduced in the cells, and the produced gases are collected therefrom.

This electrolyser has a limited capability to operate under internal pressure, that is with the electrolyte and produced gases under pressure. The cell frames and the end plates of the cell stack, in fact, must withstand the whole difference of pressure (delta-p) between the inside and the outside, usually at atmospheric pressure. Over a certain delta-p, the cell frames are not able to endure the mechanical stresses, nor their gaskets to prevent leakage of the electrolyte or gases and, in practice, this electrolyser is limited to an internal pressure of a few tens of bar.

To overcome this problem, a different kind of pressurized electrolysers has been proposed. The basic idea is to balance the internal pressure of the cell stack, operating the same cell stack inside a pressurized vessel.

U.S. Pat. No. 6,153,083 discloses an electrolyser for the electrolysis of water under pressure, where the stack of bipolar cells, responding to the already mentioned filter-press configuration, is encapsulated in a pressure vessel. The two end electrodes of the stack are connected to the electricity source by two leading-in cables running through the pressure vessel, the interior of the pressure vessel being filled with pressurized water surrounding the cell stack. Faults of this design, however, because not described in detail, although very difficult to be solved in the practice, are the cables passage through the pressurized vessel, and devices for feeding the alkaline electrolyte inside the cell stack, as well for collecting the hydrogen and oxygen gases delivered by the stack. In practice, there is the need to provide inputs/outputs through the pressurized vessel, where tightness is crucial and any leakage may compromise the operation of the electrolyser. A pressure drop in the vessel, in particular, would cause, in most cases, irreparable damage to the electrolyser inside. Moreover, this design has been used for pressures of up to 30 bar, insufficient for hydrogen storage as above discussed.

A different encapsulation technique is disclosed in DE 44 18 999. The cell block is surrounded by a pressure tube, closed at the two ends by two respective flanges, which are also the end covers of the cell block, and therefore are provided with the necessary connections for leading the fluids in and out the electrolysis cells. The space inside the pressure tube and outside the cell block is put under hydraulic pressure by the electrolyte feed to the electrolysis cells. In order to compensate for the differential expansion between the cell block and the vessel, forced to have the same length, the cell frames (in non-conductive material) are alternated with elastomeric flat gaskets. This design has a weak point in the tightness of said gaskets and, moreover, the use of the conductive electrolyte as pressurizing fluid increases the risk of short circuit in case of cell leakage.

Another problem of the prior art is the different thermal expansion of the vessel or pressure tube, compared to thermal expansion of the cell stack inside, which may be the cause of mechanical stress with the risk of leakage and release of electrolyte. In a water-pressurized system, even a small leakage of electrolyte is fatal because the water becomes conductive with occurrence of electric shunts and parasitic currents, and related power losses, or even short circuits and serious damage of the cell stack.

Hence, the drawbacks of the prior art can be summarized as follows. Some of the known pressurized electrolysers can operate at pressure levels well below the need for a reasonable reduction of the hydrogen specific volume to the end of the gas bulk storage; fluid and electrical connections through the pressure vessel, in particular, are critical for the tightness of the system; the generalised use of water as a pressurizing medium leaves the risk of parasitic currents or dangerous short-circuits in case of electrolyte leakage; the alternative use of the electrolyte to pressurize the vessel is even more dangerous for the reasons discussed above. These drawbacks, discussed in relation to the electrolysis of water, can also be generalized to other applications.

SUMMARY OF THE INVENTION

The problem underlying the invention is to provide a structure of a pressurized cell-stack electrolyser adapted to overcome the above limitations, and in particular to safely and reliably generate hydrogen from water, at the high pressure required by the use of hydrogen as a fuel or energy carrier.

This problem is solved with an electrolyser comprising:
a pressure vessel having a shell and opposite closed ends;
an electrolysis cell stack inside said pressure vessel, comprising a plurality of bipolar electrolysis cells stacked between a first and a second terminal end plates, the cell stack being arranged to operate under internal pressure;
fluid connections for feeding an electrolyte to the cell stack and for collecting the product(s) of the electrolysis from the cell stack, and electric connections comprising at least an anode and a cathode connection,
the electrolyser being characterized in that:
the first terminal end plate of the cell stack is integral with one of said closed ends of the pressure vessel, thus forming a stationary head of the cell stack;
said stationary head is equipped with said fluid connections and electric anode and cathode connections with the cell stack;
the second terminal end plate of the cell stack is inside the vessel and is free to move in a longitudinal direction relative to the first terminal end plate and to the vessel, in response to thermal expansion or contraction, thus forming a floating head of the cell stack In a preferred embodiment of the invention, said closed ends are a cover on one side, and a flat end cover or dead flange, which also constitutes the first terminal end plate of the cell stack, on the other side.

According to preferred features, said anode and cathode electric connections comprise: at least a first electric connector, preferably in the form of a tie-rod, passing through the first terminal end plate, insulated from said plate and electrically connected to the first cell of the stack, namely the cell closer to the stationary head; at least a second electric connector associated and electrically connected to the first terminal end plate, the first terminal end plate being electrically connected with the second terminal end plate. For example, the first electric connector is positive, carrying the anodic current to the first cell, and said second electric connector is the negative, thus having the duty of cathode termination for the last cell of the stack.

In a preferred realization, the terminal end plates of the cell stack are set together by tie rods, providing mechanical and electrical connection between the two plates.

A preferred embodiment of the invention provides that the electrolyser is fully polarized at the same potential of the floating head, and that only one of the electric connections (anode/cathode) has to be taken from the inside of the electrolyser, through the shell or any cover of the vessel. For example, tie rods constituting the negative electric connection are fixed to the closed end forming the stationary head, which is electrically and mechanically connected by tie-rods to the internal floating head and then to the terminal end plate of the cell stack; an insulated tic rod passes through the floating head, providing the positive electric connection to the first end plate of the stack.

According to another aspect of the invention, the vessel is kept under pressure with a gas, rather than a liquid as in the prior art. Hence, an aspect of the invention is an electrolyser comprising a pressure vessel and an electrolysis cell stack inside said pressure vessel, the cell stack comprising a plurality of bipolar electrolysis cells stacked between a first and a second terminal end plates, characterized in that the vessel is pressurized by a gas.

The gas pressurising the vessel can take part or not into the electrolysis process. More specifically, the gas pressurising the vessel is for example an inert gas, i.e. having an inert nature in relation to the electrolysis process or, as an alternative, a gas produced under pressure in the electrolysis process itself. Preferably, the gas is taken from the electrolysis process, which is carried out in the cell stack at a pressure which can be higher than the pressure level in the vessel, so that no intermediate compression is required for the use of said gas to pressurize the vessel.

An equipment for electrolysis, according to the invention, comprises: an electrolyser with a cell stack inside a pressure vessel, the cell stack being adapted to supply at least a gas product under pressure; at least a vessels receiving said gas product and adapted to separate the gas product from entrained electrolyte; a flow line feeding at least a portion of said gas product as a pressurizing medium into said pressure vessel.

Preferably, in a gas-pressurized electrolyser according to the invention, the cell stack has the above arrangement with a stationary head and a floating head, namely: the first terminal end plate of the cell stack is integral with one of the end covers of the pressure vessel, thus forming the stationary head, equipped with suitable fluid connections for feeding the electrolyte to the cell stack, and for collecting the product(s) of the electrolysis, and also equipped with anode and cathode electric connections with the cell stack; the second terminal end plate is movable in a longitudinal direction relative to the first terminal end and the vessel, in response to thermal expansion and contraction, thus constituting the floating head.

Referring now to the preferred application to the electrolysis of water, nitrogen or any other inert gas in relation to the electrolysis of water can be used as a pressurizing medium in a gas-pressurized electrolyser according to the invention; in a second option, at least a portion of the hydrogen or a portion of the oxygen delivered under pressure by the cell stack is used to pressurize the vessel. The internal pressure of the cell stack in operation is preferably at least 30 bar, more preferably greater than 100 bar and even more preferably in the range 100 to 700 bar.

An equipment for the electrolysis of water, according to a preferred embodiment of the invention, comprises: an electrolyser comprising a cell stack inside a pressure vessel, the cell stack being adapted to furnish hydrogen and oxygen under pressure; at least a separation vessel receiving the hydrogen and another separation vessel receiving the oxygen produced in the electrolyser, said vessels being adapted to separate the hydrogen and oxygen, respectively, from entrained electrolyte; a flow line feeding at least a portion of said hydrogen or a portion of said oxygen as a pressurizing medium into said pressure vessel, from the respective vessel. The electrolyser of said equipment for electrolysis of water has preferably the above discussed arrangement with a stationary head and a floating head.

The pressure can be controlled e.g. with a differential pressure controller, sensitive to the delta-p between the two vessels, or keeping constant the level of the entrained electrolyte in the respective vessel, from which the pressurizing medium (hydrogen or oxygen) is taken.

In all the above embodiments of the invention, the fluid-tightness of the cell stack is preferably obtained in accordance with the disclosure of EP 0212240. Each bipolar cell has two elements, called separating element and bipolar element, in form of frames internally carrying the diaphragm or membrane and, respectively, the bipolar plate. The frames are preferably of circular shape to withstand to the internal pressure, and are moulded in reinforced plastics, with the result to be electrically non-conductive. Their tightness is simply obtained by O-ring gaskets, requiring a very low effort to the tie rods and related end covers completing the filter-press configuration of the stack. Liquid electrolyte and product gases are distributed and collected from the cells by channels moulded inside the frames, ending on one of the terminal, metal plates.

Frames are relatively thin, in the range of few millimeters, as well as the cathode and anode chamber of each cell, which are occupied by very thin and flexible electrodes. The moulding technique allows to producing large series of frames in a short time. Moreover, frames of different size may be easily moulded to produce cells of different capacity. The high current density and the limited size of the cells allow a very compact construction, with the possibility of assembling totally the electrolysis plant before shipment.

The invention has many advantages that allow to safely and reliably carry out the process of electrolysis at a pressure much greater than in the prior art. The invention allows to make available the gas product at a pressure well above the 30 bar which are substantially the limit of the prior art; in particular, the invention is suitable for production of $H_2$ from electrolysis of water, directly at a pressure of hundreds of bar, as required for hydrogen-fueled vehicles. As the hydrogen is directly available from the electrolysis at the pressure of use, the costs related to compression are saved, or greatly reduced, and the use of hydrogen as fuel or energy carrier is made more attractive.

The cell stack with stationary head and floating head solves the problems of differential thermal elongation between the stack and the containing vessel, as the floating head is not firmly associated with the shell of the vessel, but on the contrary is free to move under the thermal expansion. Moreover, thanks to the invention the electric connections are available at the stationary head, being no longer necessary to provide the electrical connections through the shell or the cover of the vessel, which are critical points for the tightness of the system. A further advantage of the invention, as it will be shown, is the guarantee of a safe grounding of the whole electrolyser, to prevent accidents to the operating people.

Use of a gaseous pressurizing medium maintains a better electrical insulation and reduces the risk of power losses or short circuit caused by electrolyte leakage. In prior-art, water-pressurized systems, a small loss of electrolyte due to leakage from the stack, can make conductive the water pressurising the vessel, favouring parasitic currents involving the stack and the vessel. Much harmful consequences may be incurred when the hydraulic pressure is directly provided by the electrolyte, because the electrolyte solution is much more conductive than water.

The use of a gas produced in the process itself, as a pressurizing medium, has the further advantage that no external compression unit is required. The gas delivered by the cell stack, for example hydrogen or oxygen in water electrolysis, can be sent to the vessel with no intermediate compression between the output of the cell stack and the inlet into the pressure vessel, or with a much less expensive compression, e.g. a single stage instead of multi-stage. Furthermore, when dealing with very high pressure electrolysers operating at 5000 psi or more, inert gases are not commercially available at such pressure levels, and it would be necessary to provide an additional and expensive gas compressing system.

Another advantage is that from the start up of the electrolysis process at low pressure, up to the final operating pressure, the gas pressurisation of the electrolyser pressure vessel grows proportionally, following the building up of the electrolysis process pressure.

DETAILED DESCRIPTION OF PREFERRED EMBODIMENTS

Figure 1:
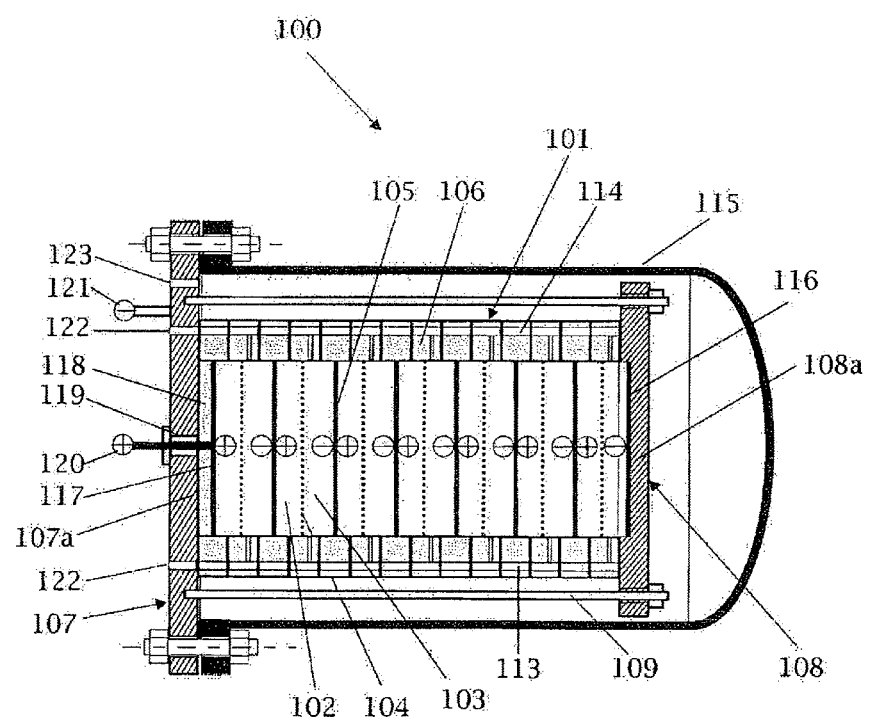
FIG. 1 illustrates schematically an electrolyser in accordance with one embodiment of the present invention.

Referring to FIG. 1, an electrolyser 100 is set up by enclosing a cell stack item 101 in a pressure vessel 115, internally pressurised by a gas phase when in operation. The vessel is formed by a horizontal, cylindrical shell, with closed ends, one of which is a flanged cover, the second one a flanged cover, or an integral end, of flat or dished type. The preferred embodiment of the second end is a dished end, welded to the cylindrical shell. The material of construction of the vessel can be a metal, or a composite material, as for instance a fiber-reinforced manufacture.

The cell stack 101 is formed by bipolar cells, each one comprising an anode 102 and a cathode 103, separated by a diaphragm or a membrane 104. In turn, each cell is separated from the next one by a bipolar plate 105. Cells have frames 106 containing channels 113 for the distribution of the electrolyte, and further channels 114 for the collection of the electrolysis products.

In accordance with the invention, a first terminal end plate 107a of the cell stack 101 is integral with an end plate cover of the pressure vessel, while the second end plate 108a of the cell stack 101 is movable inside the vessel, in a longitudinal direction relative to the plate 107a and the shell of the vessel 115, in response to thermal expansion and contraction. Hence, the end plate 107a forms a stationary head 107 of the cell stack 101, while the opposite end plate 108a forms a floating head 108 of the same cell stack.

The stationary head 107 is equipped with the fluid connections for feeding an electrolyte to the cell stack, and for collecting the product(s) of the electrolysis, and is also equipped with anode and cathode electric connections with the cell stack.

Turning again to the embodiment of FIG. 1, all process connections 122 of the stack 101, regarding gases and liquids, are grouped on the plate 107a, leaving the stack free of expanding inside the vessel 115.

The anodic connection is given by a rod 120, passing through the plate 107a and electrically insulated with respect to said cover by a bush 119, carrying the anodic current directly to the first anode 117 of the stack 101. Said first anode 117 is electrically insulated from the plate 107a by an insulating plate 118. The rod 120 is provided with adequate gaskets, making it leak-tight with respect to the internal space under pressure.

The end plate 108a is electrically in contact with the end cathode 116 of the stack 101, and is connected via tie rods 109 to the plate 107a. Hence, the plates 107a and 108a are equipotential.

The cathode terminal connection is also located directly on the plate 107a, in the form of a tie rod 121. By grounding this connection, the whole electrolyser is grounded, besides the only anodic connection 120, which can be easily protected from any contact with the operating personnel, thus making the design particularly safe.

It should be noted that the vessel 115 is equi-potential with the cell stack plates 107a and 108a, due to the electrical connection given by tie rods 109. Hence, the only insulated connection to be passed from inside to outside of the electrolyser is the rod 120, in the example passing through the end cover of the vessel represented by the plate 107a.

Figure 2:
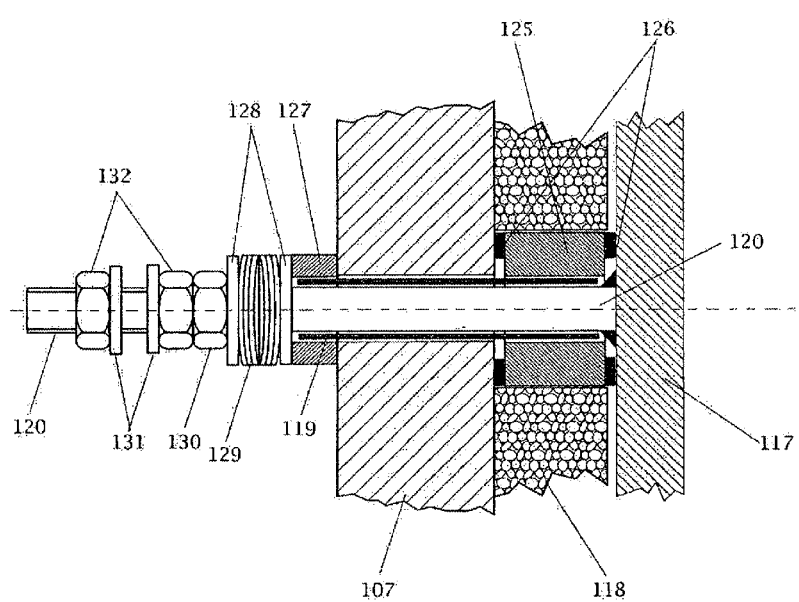
FIG. 2 is a detail of the anodic current feed of the electrolyser of FIG. 1.

A preferred embodiment of the anodic connection rod 120 is shown in further detail in FIG. 2. The tie rod 120 is welded to the first anode 117 of the stack, while at the opposite end it is threaded, and carries two washers 131 and two nuts 132, devised to fix the anodic electric cable. The electrically insulating, tubular bush 119 avoids the contact between the rod 120, under anodic polarisation, and the grounded plate 107.

An insulating bush 125 and flat gaskets 126 separate the high-pressure space, acting on the outside diameter of said bush 125 and gaskets 126, from the low-pressure space, surrounding the rod 120. The two gaskets 126 are compressed between the bush 125 and the plate 107a and, respectively, between the bush 125 and the anode 117. In order to keep tight the gaskets 126, a nut 130 draws the anode 117 against the plate 107a by means of the tie rod 120, cup springs 129, located between two washers 128, and an insulating bush 127. The space between the plate 107a and the anode 117 is occupied by an insulating plate 118.

The selection of the materials for the realisation of the electrically insulating bushes 125 and 127 requires a special care, because both must withstand high compressive forces and, mainly the item 125, must by impermeable to the ambient humidity, avoiding to creating electric shunts between the items under anodic polarisation and the ground. A material usable for the item 125 is, for instance, a glass-mica composite, while for the item 127 a mica-paper laminate material may be adequate.

Reverting to FIG. 1, a port 123 is provided on the stationary head 107 for the pressurizing of the space internal to the pressure vessel 115, and external to the cell stack 101. Alternatively, this connection may be located at any place on the shell 115.

In a preferred embodiment of this invention, wherein the sealing each other of the cell frames of the stack are obtained by o-ring gaskets, as disclosed in EP 0212240, the pressure internal to the vessel 115 has to be proportioned to the operating pressure inside the stack 101.

The pressurizing medium, according to an aspect of the invention, is preferably a gas. The pressurising gas may be for instance nitrogen, or argon, or carbon dioxide, all extraneous to the electrolysis process. A source of one of such inert gases, like a bottle, may be connected to the port 123, by means of a tubular connection, provided with a pressure reducer or controller. In a second example the gas pressurising the electrolyser jacket may be a gas product delivered by the electrolysis process, such as hydrogen or oxygen in the case of water electrolysis.

Figure 3:
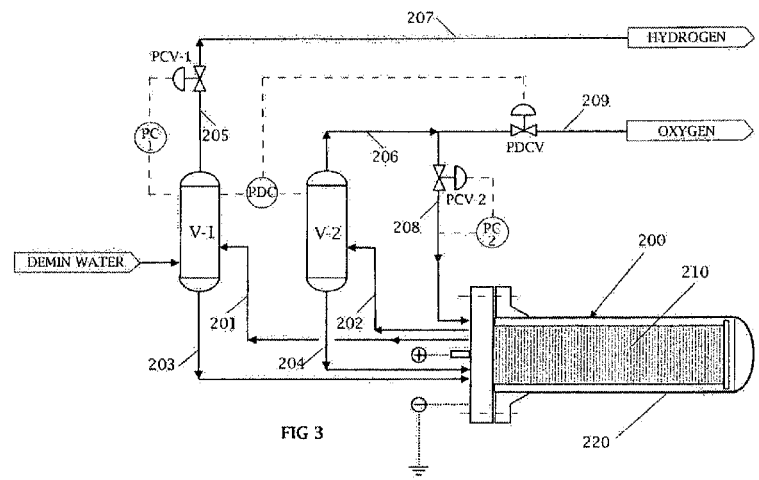
FIGS. 3 and 4 show examples of flow diagram relating to the application of this invention to the high-pressure electrolysis of water.

FIG. 3 is an example of equipment for the electrolysis of water, comprising a gas-pressurized electrolyser 200 substantially realised as in FIGS. 1-2.

The electrolyser 200 comprises a cell stack 210 inside a pressure vessel 220, and produces hydrogen and oxygen, which are delivered from the stationary head of the cell stack to the vessels V-1 and V-2, respectively, by pipes 201 and 202. Together with the gases some electrolyte is entrained and said vessels V-1 and V-2 have the duty of separating out the gases from the entrained liquid, which is returned to the electrolyser by pipes 203 and 204.

Hydrogen exits the vessel V-1 through the pipe 205, whereon the pressure controller PC-1 sets the hydrogen-side pressure inside the vessel by throttling the valve PCV-1, and afterwards hydrogen is delivered to its final use by a pipe 207.

Oxygen exits the vessel V-2 through the pipe 206, to be delivered to its final use by the pipe 209. Oxygen-side pressure inside the vessel V-2 is controlled by a differential pressure controller PDC, throttling a valve PDCV, so as to remain in the range of the hydrogen-side pressure.

A line 208, connecting the line 206 to the pressure vessel 200, keeps the inside pressure of the vessel itself at a value controlled by the instrument PC-2 by throttling the valve PCV-02.

The described embodiment can be reversed, by exchanging the role of the two gases, using then hydrogen as a pressurization means of the vessel 220.

Figure 4:
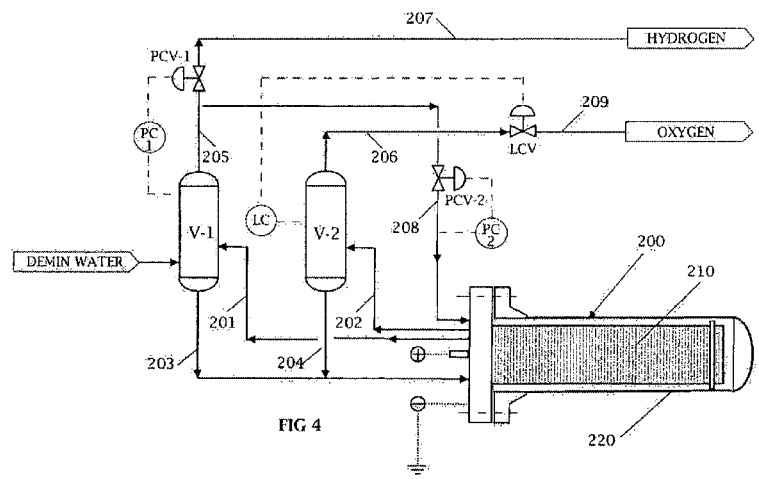

A further example is depicted in FIG. 4, corresponding to alternative control criteria of the electrolysis process. The vessels V-1 and V-2 are interconnected on the lower part by a pipe, so as to equalize the internal pressure of the two vessels, and consequently of the cathode and anodic compartments of the cells. In this case hydrogen delivery pressure is controlled as in the previous case of FIG. 3. Oxygen delivery is controlled by keeping constant the electrolyte level inside V-2. The pressurisation of the vessel 220 is shown as made by hydrogen itself, through the loop PC-2/PCV-2, although it could be made by oxygen, as in the case of FIG. 3. Alternative control criteria may be selected by the skilled person.

The invention reaches the aims and purposes stated above, and is particularly suitable for the production of high pressure hydrogen from the electrolysis of water.

The invention claimed is:

1. An electrolyser comprising:
    a pressure vessel having a shell and opposite closed ends;
    an electrolysis cell stack inside said pressure vessel, comprising a plurality of bipolar electrolysis cells stacked between a first terminal end plate and a second terminal end plate, the cell stack being arranged to operate under internal pressure;
    fluid connections for feeding an electrolyte to the cell stack and for collecting the product(s) of the electrolysis from the cell stack, and electric connections comprising at least an anode and a cathode connection,
    wherein:
    the first terminal end plate of the cell stack is integral with one of said closed ends of the pressure vessel, thus forming a stationary head of the cell stack;
    said stationary head is equipped with said fluid connections and electric anode and cathode connections with the cell stack;
    the second terminal end plate of the cell stack is inside the pressure vessel and is free to move in a longitudinal direction relative to the first terminal end plate and to the vessel, in response to thermal expansion or contraction, thus forming a floating head of the cell stack.

2. The electrolyser according to claim 1, wherein the vessel has a flat end cover which also constitutes said first terminal end plate of the cell stack.

3. The electrolyser according to claim 1, wherein said electric connections comprise:
    at least a first electric connector passing through said first terminal end plate of the cell stack, insulated from said plate and electrically connected to the first cell of the stack;
    at least a second electric connector associated and electrically connected to the first terminal end plate, the first terminal end plate being electrically connected with the second terminal end plate of the stack.

4. The electrolyser according to claim 3, wherein said first and second terminal end plates of the cell stack are set together by tie rods, providing mechanical and electrical connection between said first and second end plates.

5. The electrolyser according to claim 3, wherein said a first electric connector and/or said a second electric connector are realized with a tie rod.

6. The electrolyser according to claim 3, wherein said first electric connector is the positive, carrying the anodic current to the first cell of the cell stack, and said second electric connector is the negative, thus having the duty of cathode termination for the last cell of the stack.

7. The electrolyser according to claim 6, wherein the first electric connector is a tie-rod passing through the stationary head of the cell stack, and insulated from said stationary head by a tubular bush;
the tie rod is fixed to the first anode of the stack; an insulating plate is provided between said first anode and the stationary head;
an insulating bush and gaskets are provided to separate said tie-rod from the pressure space inside the cell stack.

8. An electrolysis process for electrolysis of water, in an electrolyser according to claim 1 comprising a pressure vessel and an electrolysis cell stack inside said pressure vessel, the cell stack comprising a plurality of bipolar electrolysis cells stacked between a first and a second terminal end plates, and arranged to operate under internal pressure, the method comprising pressurizing the vessel during operation of the cell stack by a gaseous medium.

9. The electrolysis process according to claim 8, wherein said gaseous medium is produced under pressure in said cell stack.

10. The electrolysis process according to claim 9, wherein the pressure in the cell stack is greater than the pressure level in the vessel.

11. The electrolysis process according to claim 8 for electrolysis of water, wherein the pressure of hydrogen furnished by the cell stack is greater than 30 bar.

12. An equipment for electrolysis, comprising:
an electrolyser according to claim 1, comprising a cell stack inside a pressure vessel, the cell stack being adapted to furnish at least a gas product under pressure;
at least a vessel receiving said gas product and adapted to separate the gas product from entrained electrolyte;
a flow line feeding at least a portion of said gas product as a pressurizing medium into said pressure vessel.

13. The equipment according to claim 12 for electrolysis of water, wherein the cell stack is adapted to furnish hydrogen and oxygen under pressure, comprising;
at least a vessel receiving the hydrogen and another vessel receiving the oxygen produced in the electrolyser; said vessel being adapted to separate the hydrogen and oxygen, respectively, from the entrained electrolyte;
a flow line feeding at least a portion of said hydrogen or a portion of said oxygen as a pressurizing medium into said pressure vessel, from the respective vessel.

14. Use of an electrolyser or equipment according to claim 1, for the production of hydrogen at a high pressure from the electrolysis of water.

15. The electrolysis process according to claim 11, wherein the pressure of hydrogen furnished by the cell stack is in the range 100 to 700 bar.

* * * * *